Aug. 26, 1924.  
C. A. HARTSHORN  
PLOW  
Filed Nov. 4, 1922

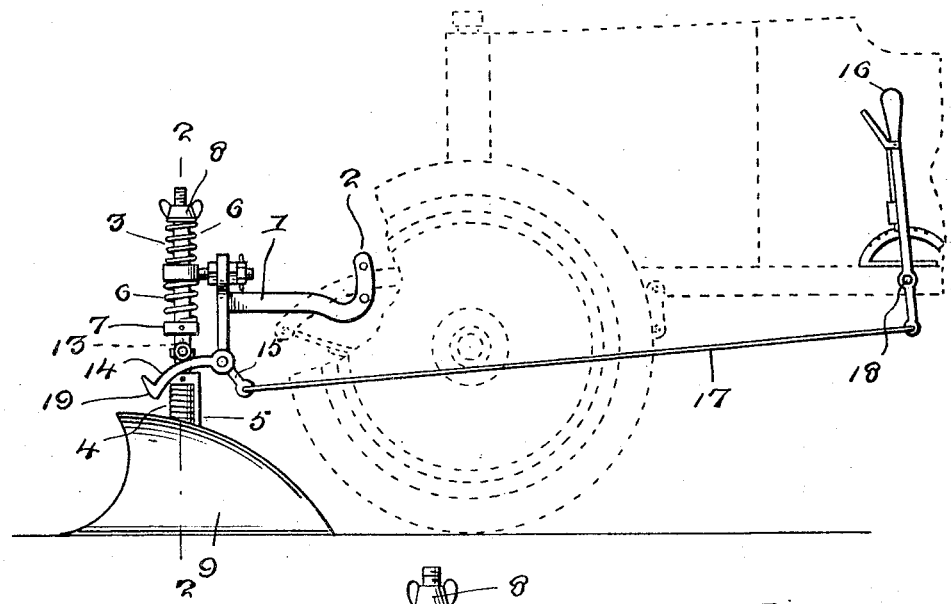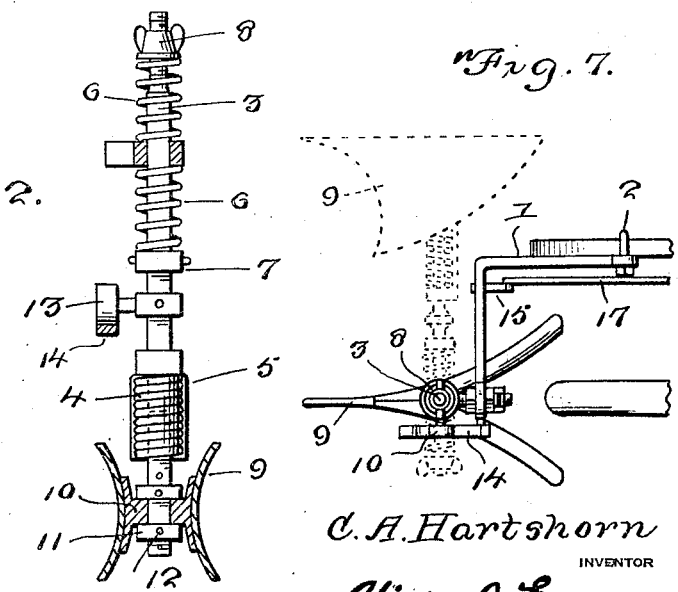

C. A. Hartshorn, INVENTOR  
BY Victor J. Evans  
ATTORNEY

E. R. Ruppert  
WITNESS:

Patented Aug. 26, 1924.

1,506,634

UNITED STATES PATENT OFFICE.

CHARLES ALBERT HARTSHORN, OF OROGRANDE, NEW MEXICO.

PLOW.

Application filed November 4, 1922. Serial No. 599,074.

*To all whom it may concern:*

Be it known that I, CHARLES A. HARTSHORN, a citizen of the United States, residing at Orogrande, in the county of Otero and State of New Mexico, have invented new and useful Improvements in Plows, of which the following is a specification.

This invention relates to an attachment for motor vehicles, the general object of the invention being to provide means for cleaning the road surface in front of the wheels of the vehicle so as to protect the tires and to prevent the wheels from slipping and skidding on wet streets.

Another object of the invention is to make the device capable of being attached to different parts of the vehicle and to provide resilient means for supporting it.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of an automobile showing my invention in use.

Figure 2 is a section on line 2—2 of Figure 1.

Figure 7 is a partial plan view showing a portion of the vehicle with the device in use.

Figure 3:
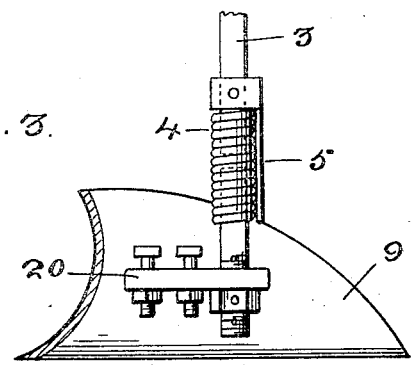
Figures 3, 4, 5 and 6 are detail views.

In these views, 1 indicates an arm which is provided with the clamps 2 whereby it can be clamped to a part of the vehicle. A two part stem 3 is carried by this arm, the two parts of the stem being connected together by the coil spring 4 and the leaf spring 5. The stem passes through a hole in the arm and a coil spring 6 is arranged on each side of the arm on the stem. The lower spring rests on a nut or collar 7 and the upper spring is engaged by a thumb nut 8 so that the tension of the springs can be adjusted. The plow is indicated at 9 and is connected to the stem by the bracket 10 which forms a means for connecting the plow detachably with the stem, the bracket having a hole therein to receive the stem and nuts 11 support the bracket on the stem. Cotter pins 12 may be used for holding the nuts against turning movement after they are adjusted. The plow is of substantially trough shape in cross section and tapers off to a point at one end.

I also provide means for raising the plows when it is not necessary to use them. Such means consists of rollers 13 on the stems which engage cams 14 formed on levers 15 which are connected with the hand levers 16 by the links 17 and the shaft 18. Stops 19 are formed on the cams to prevent the rollers from coming entirely off the cams.

Figure 4:
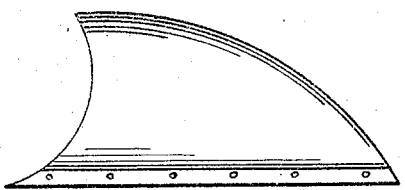
Figure 6:
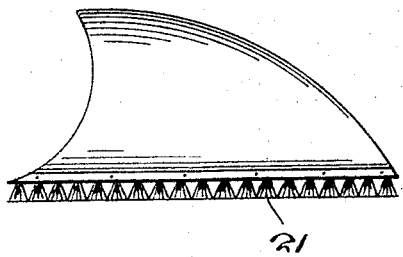
Figure 5:
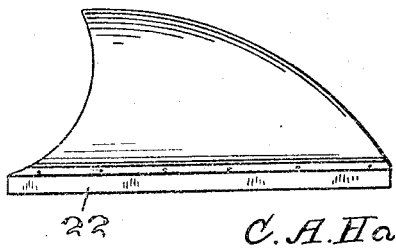

I may form an arm 20 on the stem and attach the plow to this arm, as shown in Figure 5 and I may provide different forms of plows to meet the different road conditions. For instance I may provide the lower edge of the plow with a steel edge for cutting through sand, mud and the like, or I may provide a plow with a brush, as shown at 21 in Figure 6, for use on streets to sweep glass and the like from away from the tires and I may provide a plow with a fiber blade, as shown at 22 in Figure 4 for cleaning the street in front of the tire of water and the like. Any or all of these plows can be used as desired.

This attachment will remove mud, snow, sand and other material from the street in front of the wheels and will also remove water and moisture as well as tacks, glass and the like.

It is thought from the foregoing description that the advantages and novel features of my invention will be readily apparent.

I desire it to be understood that I may make changes in the construction and in the combination and arrangement of the several parts, provided that such changes fall within the scope of the appended claims.

Having thus described my invention what I claim is:—

1. An attachment for a motor vehicle comprising a bracket adapted to be connected with the vehicle at each side of the front thereof, a two-part stem yieldingly supported by each bracket, spring means for normally holding the two parts of the stem in vertical alignment and a plow connected with the lower end of each stem and arranged in front of each front wheel of the vehicle.

2. An attachment for a motor vehicle comprising a bracket adapted to be connected with the vehicle at each side of the front thereof, a two-part stem yieldingly supported by each bracket, spring means for normally holding the two parts of the stem in vertical alignment, a plow connected with the lower end of each stem and arranged in front of each front wheel of the vehicle and manually operated cam means for raising the plow.

In testimony whereof I affix my signature.

CHARLES ALBERT HARTSHORN.